United States Patent
Mori

(10) Patent No.: US 6,606,205 B2
(45) Date of Patent: Aug. 12, 2003

(54) CONVERTER

(75) Inventor: Yoshitaka Mori, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 103 days.

(21) Appl. No.: 09/859,586

(22) Filed: May 18, 2001

(65) Prior Publication Data

US 2001/0043406 A1 Nov. 22, 2001

(30) Foreign Application Priority Data

May 19, 2000 (JP) ........................................ 2000-148266

(51) Int. Cl.[7] ............................ G02B 15/14; G03B 17/00
(52) U.S. Cl. ............................ 359/694; 359/704; 396/72
(58) Field of Search ........................... 359/694, 704, 359/695, 698, 823, 827, 829, 830; 396/72

(56) References Cited

U.S. PATENT DOCUMENTS

| | | | | |
|---|---|---|---|---|
| 4,426,135 A | * | 1/1984 | Hashiya | 359/673 |
| 4,482,228 A | * | 11/1984 | Fujita | 396/73 |
| 4,725,864 A | * | 2/1988 | Ogawa et al. | 396/73 |
| 5,086,312 A | * | 2/1992 | Tanaka et al. | 396/75 |
| 5,696,634 A | * | 12/1997 | Watanabe et al. | 359/694 |
| 6,308,013 B1 | * | 10/2001 | Tanaka et al. | 396/74 |

FOREIGN PATENT DOCUMENTS

| | | |
|---|---|---|
| JP | 08171043 A | 7/1996 |
| JP | 11101933 A | 4/1999 |

* cited by examiner

Primary Examiner—Georgia Epps
Assistant Examiner—Gary O'Neill
(74) Attorney, Agent, or Firm—Birch, Stewart, Kolasch & Birch, LLP

(57) ABSTRACT

An auxiliary lens with which lenses are held within a mount has an afocal magnification of 0.8 and serves as a wide-angle conversion lens when attached to the front face of a taking lens with a small aperture. On the other hand, when attached to the front face of a taking lens with a large aperture, the auxiliary lens serves as a ratio conversion lens for an aspect ratio switchable camera which can switch an aspect ratio of the imaging area from 16:9 to 4:3.

4 Claims, 9 Drawing Sheets

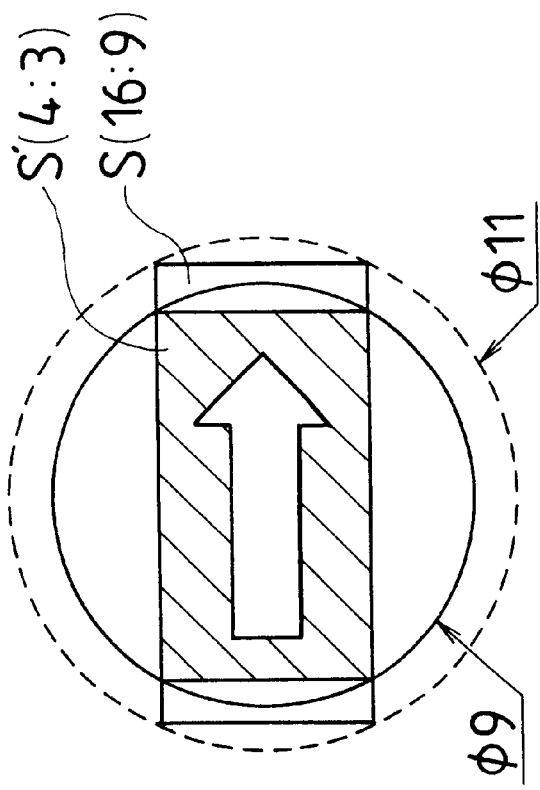
F I G. 5 (A)
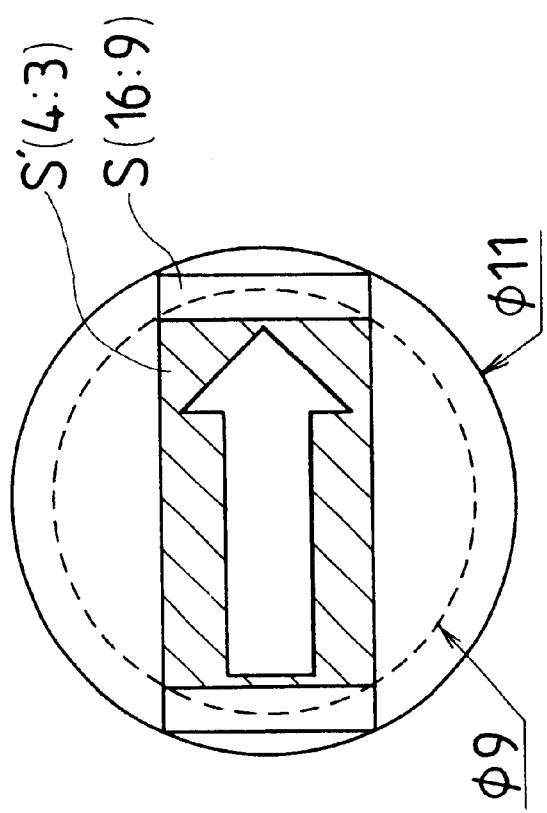
F I G. 5 (B)

F I G. 6
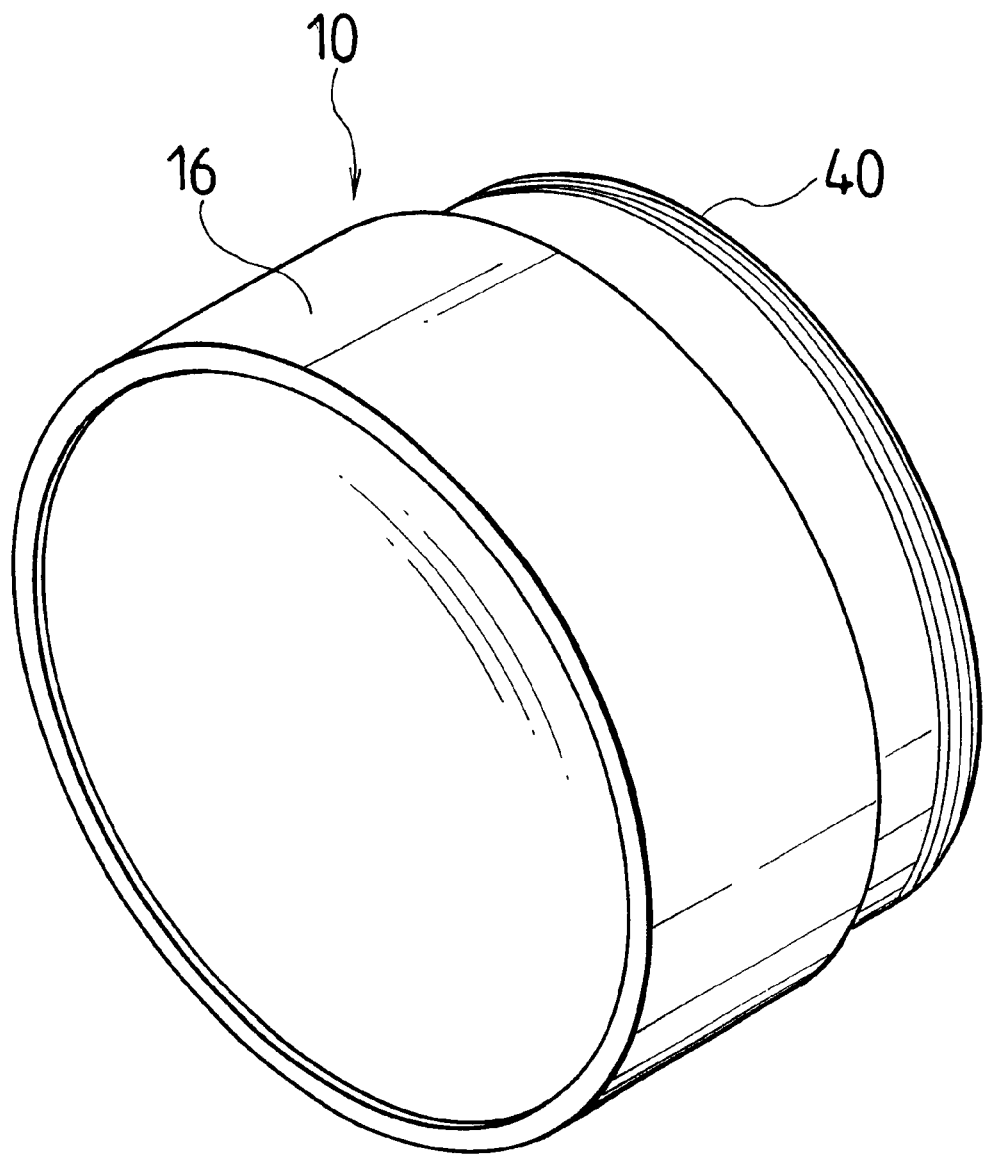

F I G. 7
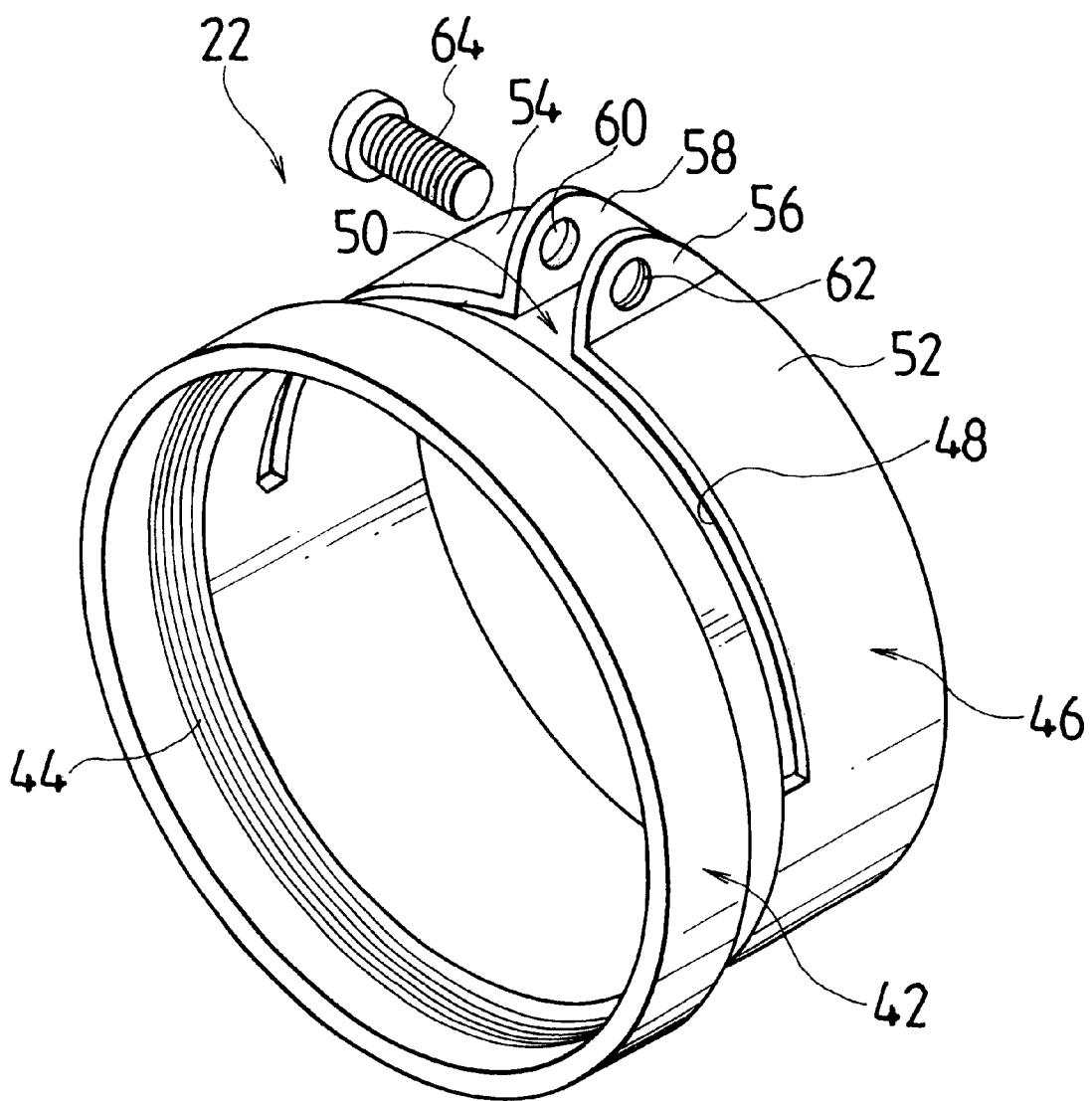

CONVERTER

BACKGROUND OF THE INVENTION

1. Field of the Invention

The present invention relates to a converter, particularly to a converter which is applied to a taking lens for a TV camera.

2. Description of the Related Art

TV screens with aspect ratios of 16:9 and 4:3 are used, and an aspect ratio switchable camera which can switch the aspect ratios has been manufactured.

The aspect ratio switchable camera has a solid-state imaging device with a 16:9 rectangular image area (an effective image area) surrounded by a $\phi11$ image circle, which is 11 mm in diameter. In a 16:9 mode, the camera uses the entire effective image area. In a 4:3 mode, the camera electrically masks areas at both sides of the effective image area to use only a 4:3 imaging area within the effective image area.

When the camera switches from the 16:9 mode to the 4:3 mode, a view angle reduces by approximately 20%. Thus, the camera does not show the full performance of the taking lens, and the maximum view angle is reduced. For the aspect ratio switchable camera, a taking lens in which a ratio converter that has a mode switching function with a magnification of 0.8 (9/11) has been known (Japanese Patent Application Laid-open Nos. 8-171043 and 11-101933). In the ratio converter, a ratio conversion lens with an afocal magnification of 0.8 is inserted into an optical system when the camera switches to the 4:3 mode, so that an image formed within an $\phi11$ image circle is reduced to an image formed within a $\phi9$ image circle.

On the other hand, a variety of types of auxiliary lenses have conventionally been marketed such as a wide-angle conversion lens and a tele conversion lens which can be easily attached and detached to and from the front of the taking lens. The wide-angle conversion lens reduces the focal length, and also forms an image formed on the 16:9 image area within the $\phi11$ image circle without vignetting.

However, since the ratio converter lens is usually provided to a tele converter together with the tele conversion lens and the like, it is difficult to detach the ratio conversion lens. Therefore, the ratio conversion lens is exclusively used for one taking lens, and cannot be shared by multiple taking lenses.

In contrast, the auxiliary lens such as the wide-angle conversion lens described above can be easily attached and detached to and from the front of the taking lens, and thus it can be shared by multiple taking lenses. By applying this advantage of the auxiliary lens, a wide-angle conversion lens with an afocal magnification of 0.8 on the market is considered to be used as a ratio conversion lens. More specifically, the wide-angle conversion lens with the magnification of 0.8 is used as a ratio conversion lens to expand the view angle; as a result, the image formed on the $\phi11$ image circle for the 16:9 mode is reduced to the image formed on the $\phi9$ image circle for the 4:3 mode.

Still, the wide-angle conversion lens forms an image in the imaging area without vignetting in a state where the image size of the imaging area is constant ($\phi11$), hence the wide-angle conversion lens is so designed as to guarantee the image size of $\phi11$ even though it is attached to the taking lens. On the other hand, the ratio conversion lens is satisfiable as long as the image size $\phi9$ of the imaging area at the time of the 4:3 mode is secured. Because of that, an outer diameter of the wide-angle conversion lens is unnecessarily large when using the wide-angle conversion lens with the magnification of 0.8 that meets with the standard of the taking lens and is marketed. As a result, the front face of the taking lens is unnecessarily heavy.

The present invention has been developed in view of the above-described circumstances, and has as its object the provision of a converter in which an auxiliary lens that can be shared by plural lenses is used as a wide-angle conversion lens or a ratio conversion lens corresponding with sizes of an aperture of the taking lens so as to increase the use of one auxiliary lens and thus to more effectively use the auxiliary lens. Moreover, the converter is superior because it is light-weighted as well as has a compact size when using the auxiliary lens as a ratio converter.

SUMMARY OF THE INVENTION

In order to achieve the above-described objects, the present invention is directed to a converter comprising: an auxiliary lens that changes focal lengths of a first taking lens and a second taking lens; and an attaching device that attaches and detaches said auxiliary lens to and from a subject side of said first taking lens and said second taking lens, wherein said auxiliary lens serves as a wide-angle conversion lens that reduces an image by expanding a view angle and at the same time forming the image without vignetting within an imaging area when the auxiliary lens is inserted into an optical system of said first taking lens, and said auxiliary lens serves as a ratio conversion lens that reduces the image by expanding the view angle and at the same time forming the image within the reduced imaging area, the image having the view angle with almost the same size as the original imaging area in a case where the imaging area is reduced in relation to an aspect ratio of the imaging area, when the auxiliary lens is inserted into an optical system of said second taking lens.

The converter is characterized in that an aperture of the second taking lens is larger than an aperture of the first taking lens, and when attaching the auxiliary lens to the second taking lens, vignetting occurs within the original image whereas no vignetting occurs within the reduced imaging area.

The converter is further characterized in that the original imaging area has an aspect ratio 16:9, and the reduced imaging area has an aspect ratio 4:3, which are formed by masking a part of both sides of the original imaging area.

According to the present invention, the auxiliary lens can be easily attached and detached to and from the subject side of the taking lens, and the auxiliary lens can be used as a wide-angle conversion lens or a ratio converter corresponding with types (apertures) of taking lenses; thus the auxiliary lens can be shared by other plural lenses as the wide-angle conversion lens or the ratio conversion lens while increasing the use of the auxiliary lens, so the auxiliary lens can be effectively used. Moreover, the auxiliary lens can be light-weighted as well as compact when using the auxiliary lens as a ratio conversion lens, by making the auxiliary lens which is used as a wide-angle conversion lens for a predetermined taking lens to be attached to a taking lens, which can be used as a ratio conversion lens but cannot be used as a wide-angle conversion lens with a larger aperture than that of the taking lens.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 5(A) and 5(B) are explanatory views for presenting the auxiliary lens which is used as a ratio conversion lens;

FIG. 6 is an external perspective view of the auxiliary lens;

FIG. 7 is an external perspective view of an adapter for the φ85 taking lens;

DETAILED DESCRIPTION OF THE PREFERRED EMBODIMENTS

Hereunder a preferred embodiment of the present invention will be described in detail in accordance with the accompanied drawings.

Figure 1:
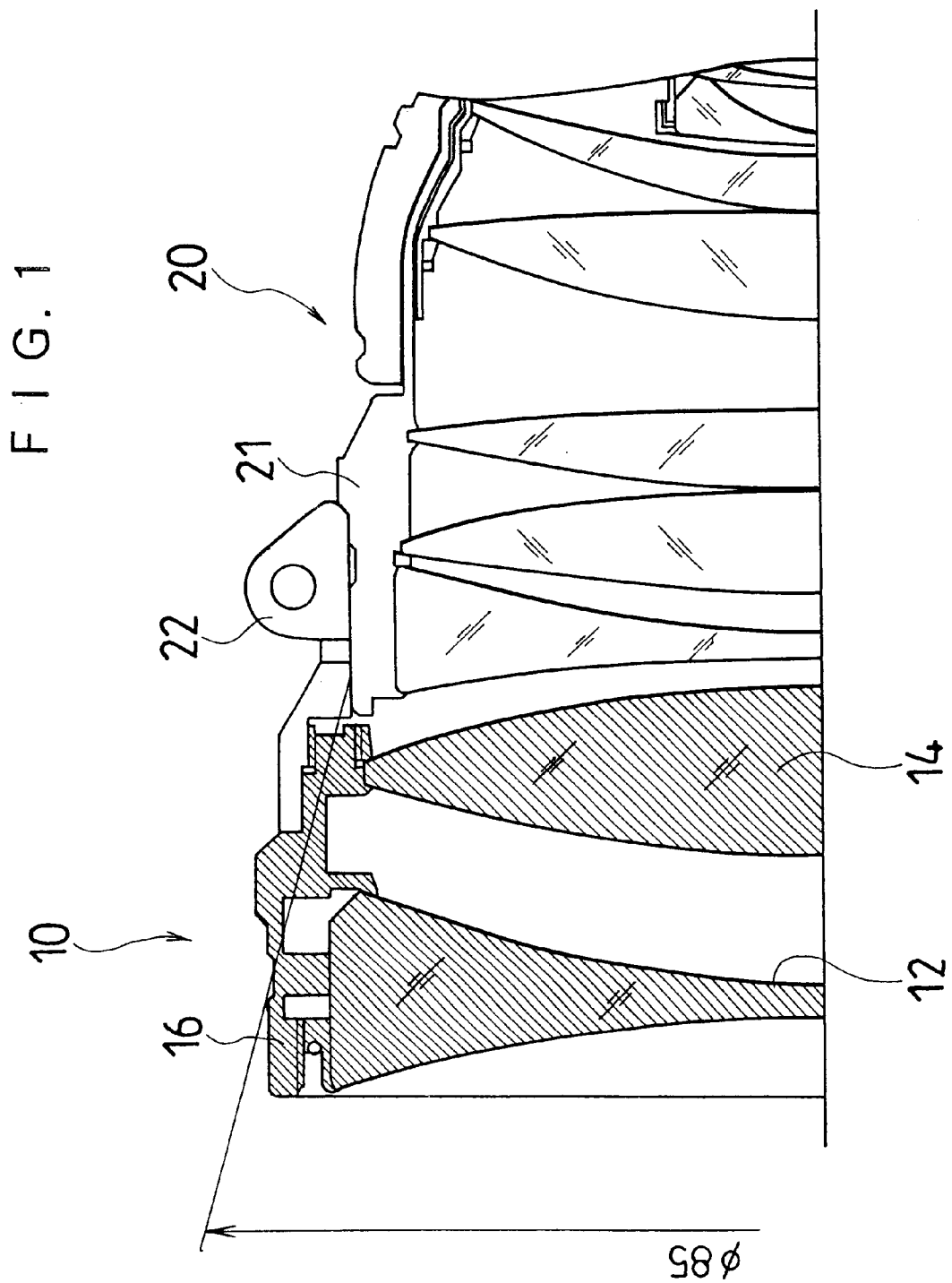
FIG. 1 is a section view showing a case where an auxiliary lens of a converter of the present invention is attached to a front face of an φ85 taking lens for a TV camera.
Figure 2:
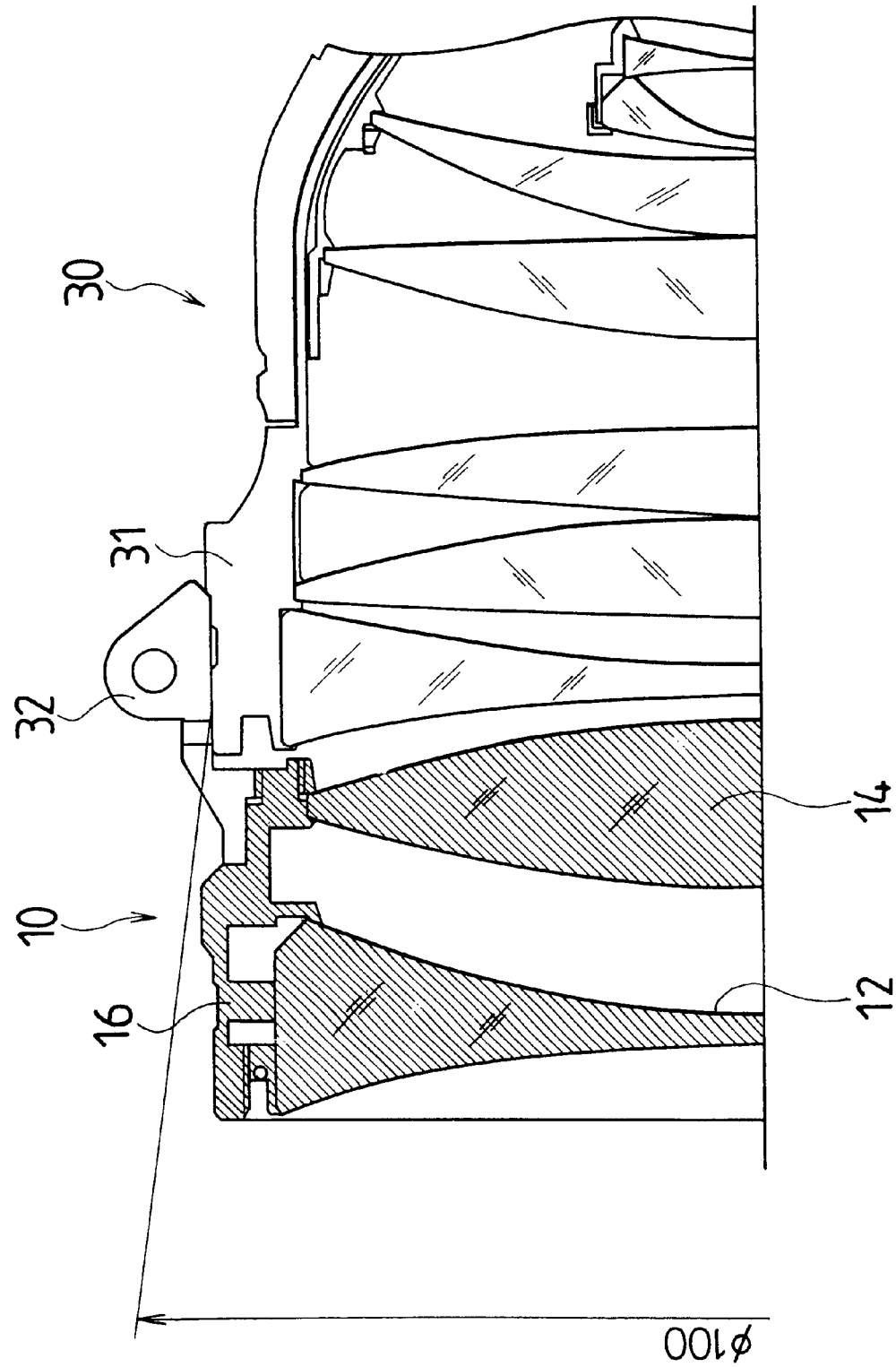
FIG. 2 is a section view showing a case where the auxiliary lens of the converter of the present invention is attached to the front face of a φ100 taking lens for a TV camera.

FIGS. 1 and 2 are section views showing a case where an auxiliary lens for a converter of the present invention is attached to a front face of a taking lens which is used as a TV camera. Sizes of taking lenses in the respective FIGS. 1 and 2 differ, in which a size of a taking lens 20 in FIG. 1 is smaller than that of a taking lens 30 in FIG. 2, and a diameter of a lens barrel 21 at a front face side (a subject side) of the taking lens is φ85 (mm) while a diameter of barrel 31 at a front face side of the taking lens 30 in FIG. 2 is φ100. In FIGS. 1 and 2, an auxiliary lens 10 shown by hatching is attached and detached to and from the front face of the respective taking lenses 20 and 30 in FIGS. 1 and 2 via respective adapters 22 and 32 which are exclusively used for attaching the auxiliary lens 10.

Figure 3:
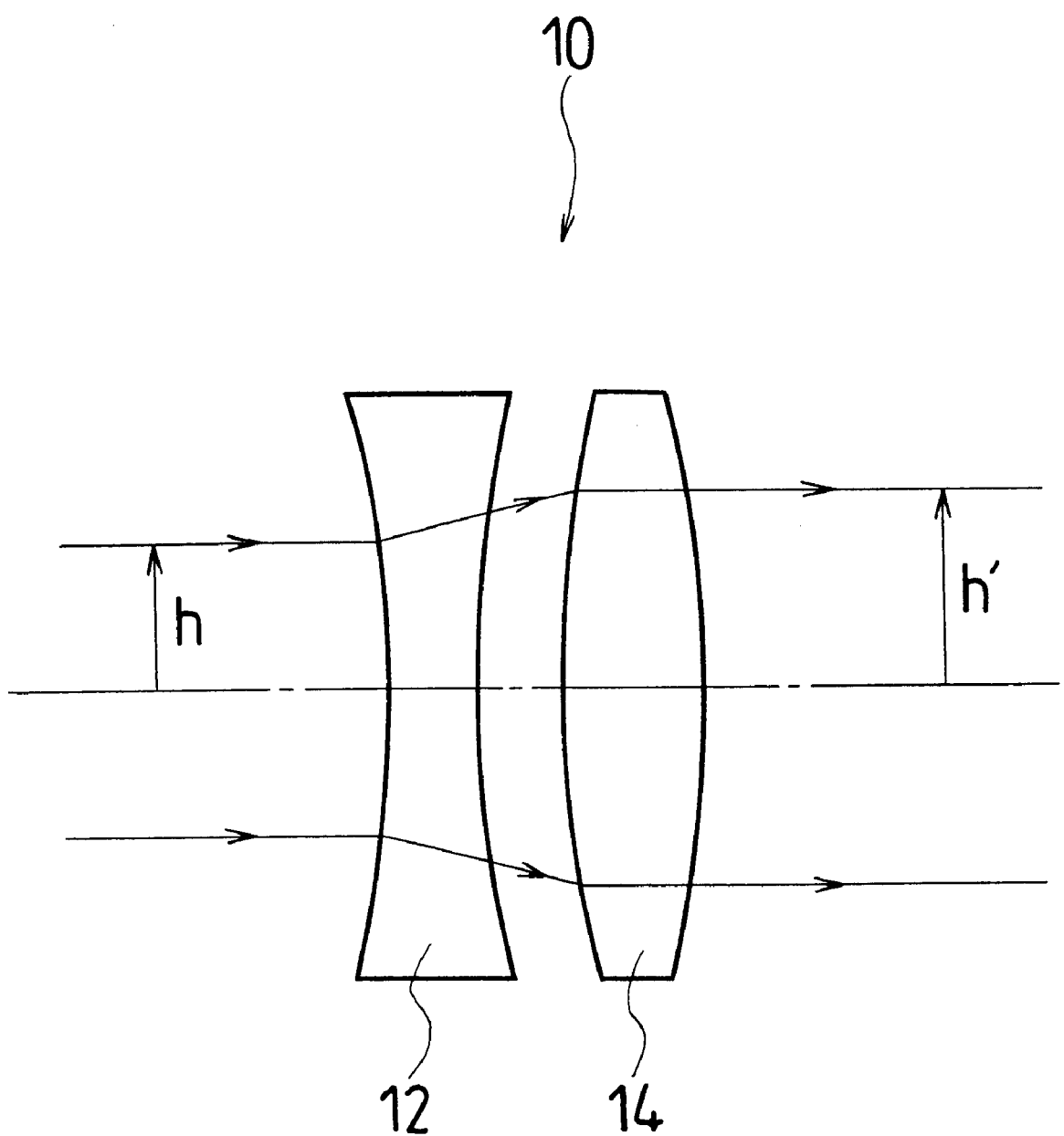
FIG. 3 is an explanatory view for presenting the auxiliary lens.

Two lenses, a double-concave lens 12 and a double convex lens 14, are held within a ring-shaped mount 16. As seen from FIG. 3, the auxiliary lens 10 is designed to have an afocal magnification of 0.8 (h/h'=0.8) by the lenses 12 and 14.

Figure 4:
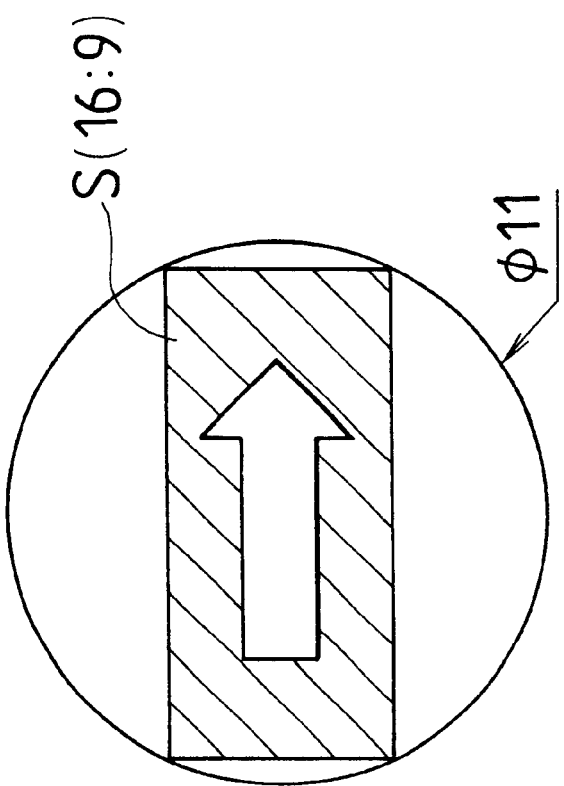
FIGS. 4(A) and 4(B) are explanatory views for presenting the auxiliary lens which is used as a wide-angle conversion lens.
Figure 4:
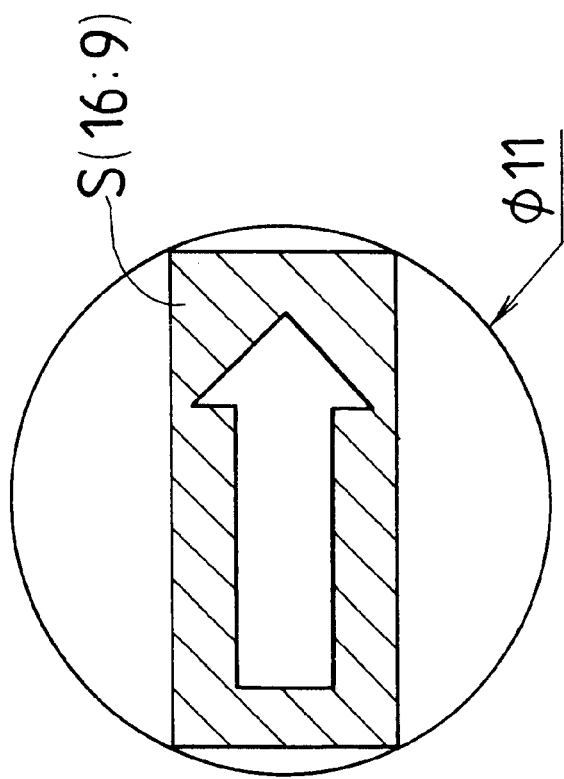

In a case where the auxiliary lens 10 is attached to the front face of the φ85 taking lens 20 as seen from FIG. 1, the auxiliary lens 10 serves as a wide-angle conversion lens with the magnification 0.8. More specifically, as seen from FIGS. 4(A) and 4(B), if an imaging area S of 16:9 of the solid-state imaging device in a TV camera has an image size of φ11, an image in the image size of φ11 is guaranteed as shown in FIG. 4(A) when not attaching the auxiliary lens 10 to the taking lens 20, and an image with a view angle corresponding with a focal length of the taking lens 20 is formed without vignetting. In the same manner, as seen from FIG. 4(B), an image with the image size of φ11 is guaranteed, and an image (the image itself is reduced in size) with a view angle which is expanded by the auxiliary lens 10 is formed within the imaging area S without vignetting. Therefore, the auxiliary lens 10 can be used as a wide-angle conversion lens with respect to the φ85 taking lens 20.

On the other hand, as seen from FIG. 2, in a case where the auxiliary lens 10 is attached to the front face of the φ100 taking lens 30, the auxiliary lens 10 serves as a ratio conversion lens. More specifically, as seen from FIGS. 5(A) and 5(B), if the imaging area S in a 16:9 mode of a TV camera (aspect ratio switchable camera) has an image size of φ9 like the case of FIGS. 4(A) and 4(B) in which an imaging area S' has an image size of φ9 in a 4:3 mode, an image in φ11 is guaranteed when not attaching the auxiliary lens to the taking lens 30 as seen from FIG. 5(A), and an image of the view angle corresponding with a focal length of the taking lens 30 is formed in the imaging area S without vignetting. If the camera switches to the 4:3 mode in that state, the image in the imaging area S' in the 4:3 mode appears to be expanded with respect to the image in the imaging area S in the 16:9 mode.

When attaching the auxiliary lens 10 to the taking lens 30 in a case where the camera switches to the 4:3 mode as presented above, the image with the image size of φ11 in FIG. 5(A) is reduced to the image with the image size of φ9 as shown in FIG. 5(B), and the image in the imaging area S' in the 4:3 mode is substantially the same as the image in the imaging area S in the 16:9 mode. As mentioned above, the auxiliary lens 10 also serves as a wide-angle conversion lens with respect to the φ85 taking lens 20. Thus although vignetting occurs with the image size of φ11 by the φ100 taking lens 30, which is larger in diameter than the taking lens 20, no vignetting occurs with the image size of φ9. The auxiliary lens 10 thus effectively serves as a ratio conversion lens with respect to the taking lens 30.

If no vignetting occurs within a range of a diameter which is larger than the image size of φ9, the auxiliary lens 10 can be used as a ratio conversion lens; however, such diameter is preferred to be small in order to make the auxiliary lens as a ratio conversion lens light-weighted and small-sized.

Now, a structure will be described for attaching the auxiliary lens 10 to the taking lenses 20 and 30 via the adapters 22 and 32 which are shown in FIGS. 1 and 2. As seen from FIG. 6, a screw part 40 is formed at a rear end side on the outer circumferential face of the mount 16 of the auxiliary lens 10. As seen from FIG. 7, a ring-shaped auxiliary lens engaging part 42 is formed at a front end side, and a screw part 44 is formed on the inner circumferential face of the engaging part 42 for engaging with the screw part 40 of the mount 16 of the auxiliary lens 10. Therefore, the rear end of the mount 16 of the auxiliary lens 10 is inserted at the front end side of the adapter 22, and the screw part 40 of the auxiliary lens 10 is screwed into the screw part 44 of the adapter 22, whereby the auxiliary lens 10 can be attached to the adapter 22.

As seen from FIG. 7, the inner circumference is formed in φ85 and a taking lens engaging part 46 for engaging with the φ85 taking lens 20 is formed at the rear end side of the adapter 22. A slit 48 is formed at the taking lens engaging part 46 substantially over the half of the circumference in a circumferential direction, and a space 50 is also formed at the taking lens engaging part 46 from the center of the slit 48 to the rear end in an axial direction. Movable rings 52 and 54 which can be elastically deformed are thus provided, and pieces 56 and 58 which are projected outwardly are formed at the tips of the movable rings 52 and 54. A hole 60 is formed at the piece 58 through which an axis of a screw 64 is inserted, while a screw hole 62 is formed at the piece 56 which is engaged with the screw 64. By this structure, the movable pieces 52 and 54 can be deformed in the direction to constrict the inner diameter of the taking lens engaging part 46 by inserting an axis of the screw 64 through the hole 60 and screwing the screw 64 into the screw hole 62.

Figure 8:
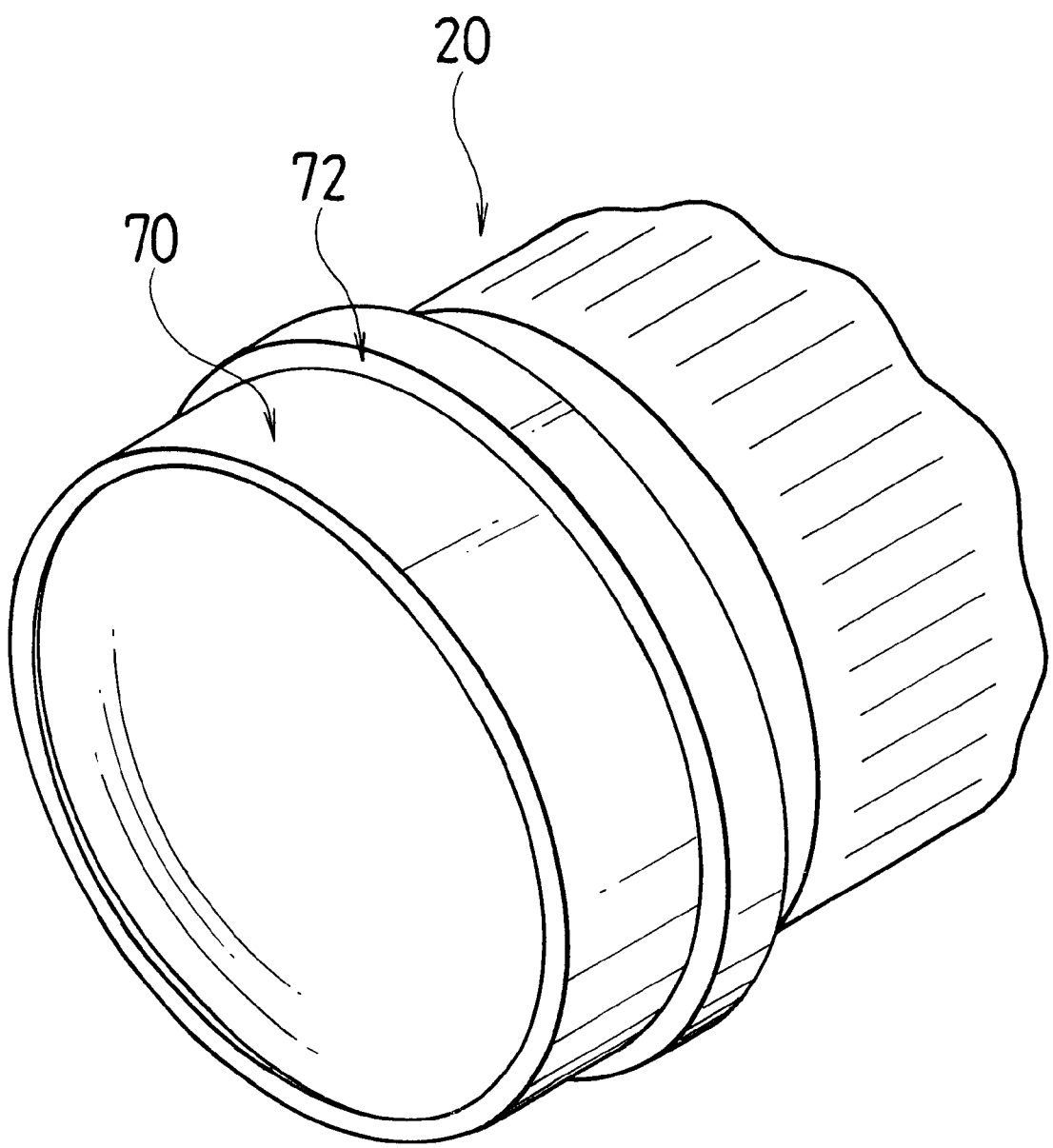
FIG. 8 is an external perspective view of a front end of the φ85 taking lens.

As seen from FIG. 8, an attaching part 70 to which a wide-angle conversion lens, a tele conversion lens, a filter, and so forth are attached, as well as a step 72 for positioning the optical accessories, are formed at the front end of the φ85 taking lens 20. In such a structure, the attaching part 70 of the taking lens 20 is fitted with inside of the taking lens engaging part 46 of the adapter 22, and the step 72 of the taking lens 20 and the rear end face of the adapter 22 are so contacted as to be positioned, then the movable rings 52 and 54 are pressed to the attaching part 70 of the taking lens 20 by pressure welding as shown in FIG. 7, whereby the adapter 22 can be fixed to the taking lens 20.

Figure 9:
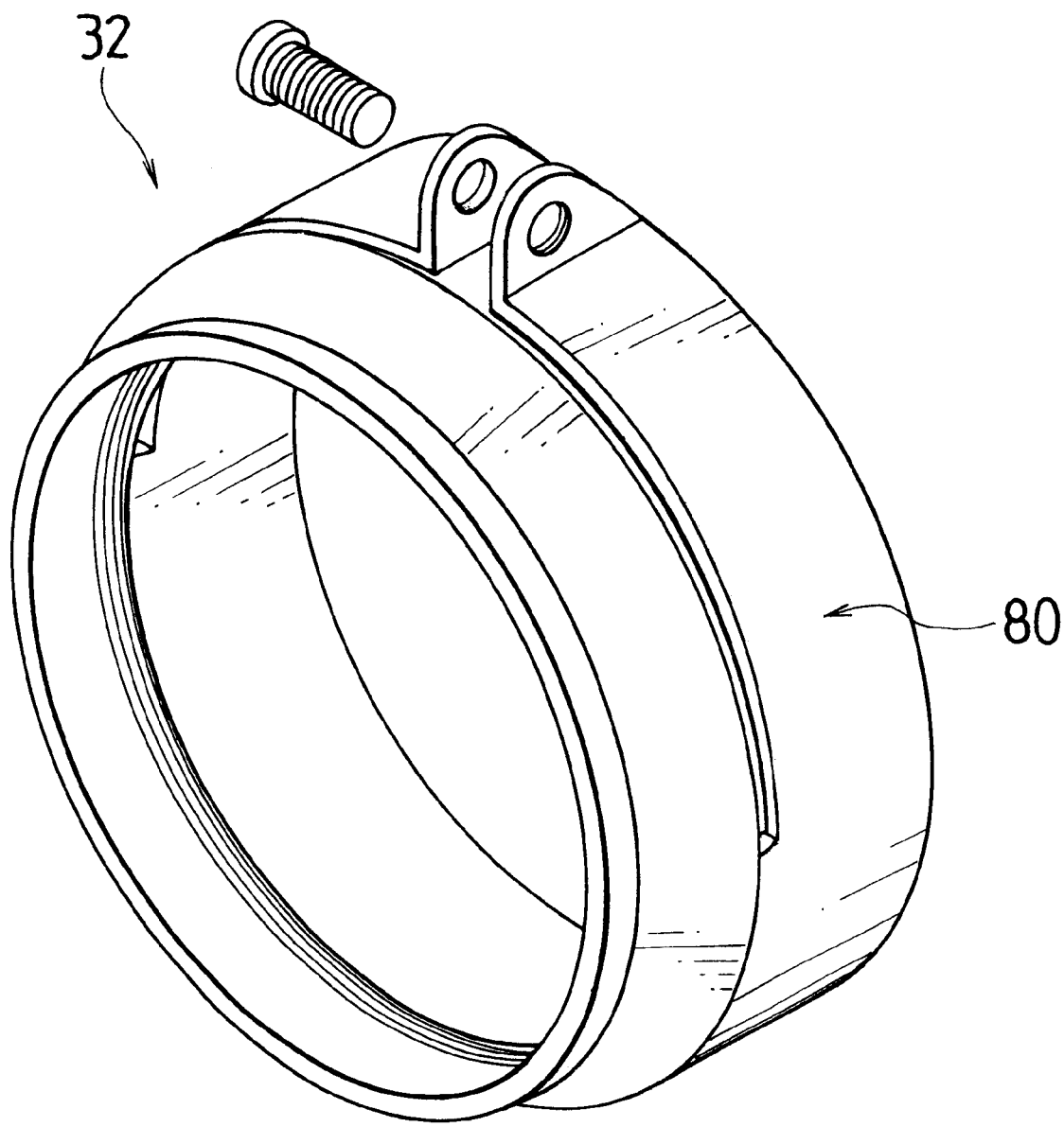
FIG. 9 is an external perspective view of an adapter for the φ100 taking lens.

By the structure described above, the auxiliary lens 10 can be easily attached and detached to and from the front face of the taking lens 20. When attaching the auxiliary lens 10 to the φ100 taking lens 30, the adapter 32 in FIG. 9 is used. The adapter 32 for the φ100 lens has the same basic structure as the adapter 22 for the φ85 lens, but differs in that the taking lens engaging part 80 has an expanded diameter so as to adapt with an outer diameter of the φ100 taking lens 30 better than the adapter 22 for the φ85 lens.

As described above, the auxiliary lens 10 which is used as a wide-angle conversion lens for the φ85 taking lens 20 and as a ratio conversion lens for the φ100 taking lens 30; however, an auxiliary lens which serves in the same manner as described above can be easily achieved with respect to taking lenses with other diameter sizes.

In the present embodiment, the auxiliary lens 10 may be a wide-angle conversion lens which is already marketed, and the wide-angle conversion lens is attached to a taking lens which size does not fit the standard by using an adapter, in order to use the auxiliary lens as a ratio conversion lens.

The structure of the adapters 22 and 32 shown in the present embodiment is just one example; other structures are also acceptable.

According to the present invention, the auxiliary lens can be easily attached and detached to and from the subject side of the taking lens, and the auxiliary lens can be used as a wide-angle conversion lens or a ratio converter corresponding with types (sizes of an aperture) of taking lenses; thus the auxiliary lens can be shared by other plural lenses as the wide-angle conversion lens or the ratio conversion lens while increasing the use of the auxiliary lens, so the auxiliary lens can be effectively used. Therefore, a photographer does not have to prepare plural auxiliary lenses in order to adapt to plural taking lenses, and can use the auxiliary lens of the present invention as a wide-angle conversion lens for a taking lens or as a ratio conversion lens for another taking lens by only changing the adapters.

Moreover, the auxiliary lens can be light-weighted as well as compact when using the auxiliary lens as a ratio conversion lens, by making the auxiliary lens which is used as a wide-angle conversion lens for a predetermined taking lens to be attached to a taking lens, which can be used as a ratio conversion lens but cannot be used as a wide-angle conversion lens with an larger aperture than that of the taking lens.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A converter comprising:

an auxiliary lens that changes focal lengths of a first taking lens and a second taking lens wherein the second taking lens having a larger diameter than the first taking lens; and an attaching device that attaches and detaching said auxiliary lens to and from a subject side of said first taking lens and said second taking lens, wherein said auxiliary lens serves as a wide-angle conversion lens that reduces an image by expanding a view angle and at the same time forming the image without vignetting within an imaging area when the auxiliary lens is inserted into an optical system of said first taking lens, and said auxiliary lens serves as a ratio conversion lens that reduces the image by expanding the view angle and at the same time forming the image within the reduced imaging area, the image having the view angle with almost the same size as the original imaging area in a case where the imaging area is reduced in relation to an aspect ratio of the imaging area, when the auxiliary lens is inserted into an optical system of said second taking lens.

2. The converter as defined in claim 1, wherein:

said original imaging area has an aspect ratio of 16:9; and said reduced imaging area has an aspect ratio of 4:3, which are formed by masking a part of both sides of said original imaging area.

3. The converter as defined in claim 1, wherein:

an aperture of said second taking lens is larger than an aperture of said first taking lens; and when attaching said auxiliary lens to said second taking lens, vignetting occurs within said original image whereas no vignetting occurs within said reduced imaging area.

4. The converter as defined in claim 3, wherein:

said original imaging area has an aspect ratio of 16:9; and said reduced imaging area has an aspect ratio of 4:3, which are formed by masking a part of both sides of said original imaging area.

\* \* \* \* \*